(12) United States Patent
Becker, IV

(10) Patent No.: US 12,163,033 B2
(45) Date of Patent: Dec. 10, 2024

(54) ULTRA HIGH STRENGTH COATING AND COMPOSITES

(71) Applicant: John C. Becker, IV, Monson, MA (US)

(72) Inventor: John C. Becker, IV, Monson, MA (US)

( * ) Notice: Subject to any disclaimer, the term of this patent is extended or adjusted under 35 U.S.C. 154(b) by 606 days.

(21) Appl. No.: 16/962,336

(22) PCT Filed: Jan. 15, 2019

(86) PCT No.: PCT/US2019/013676
§ 371 (c)(1),
(2) Date: Jul. 15, 2020

(87) PCT Pub. No.: WO2019/140447
PCT Pub. Date: Jul. 18, 2019

(65) Prior Publication Data
US 2020/0339821 A1    Oct. 29, 2020

Related U.S. Application Data

(60) Provisional application No. 62/617,476, filed on Jan. 15, 2018.

(51) Int. Cl.

| | | |
|---|---|---|
| C09C 3/10 | (2006.01) | |
| C04B 20/10 | (2006.01) | |
| C09C 1/30 | (2006.01) | |
| C09C 1/44 | (2006.01) | |
| C09D 7/40 | (2018.01) | |
| C09D 7/62 | (2018.01) | |
| C08K 3/04 | (2006.01) | |
| C08K 3/36 | (2006.01) | |
| C08K 9/04 | (2006.01) | |

(52) U.S. Cl.
CPC ............ *C09C 3/10* (2013.01); *C04B 20/1037* (2013.01); *C09C 1/3072* (2013.01); *C09C 1/44* (2013.01); *C09D 7/62* (2018.01); *C09D 7/67* (2018.01); *C09D 7/68* (2018.01); *C09D 7/69* (2018.01); *C01P 2004/61* (2013.01); *C01P 2004/62* (2013.01); *C01P 2004/64* (2013.01); *C08K 3/042* (2017.05); *C08K 3/36* (2013.01); *C08K 9/04* (2013.01)

(58) Field of Classification Search
CPC .................................... C09C 3/10; C09D 7/62
See application file for complete search history.

(56) References Cited

U.S. PATENT DOCUMENTS

| | | | | |
|---|---|---|---|---|
| 7,125,635 B2 * | 10/2006 | Wu | ................... | G03G 5/144 |
| | | | | 430/65 |
| 8,124,680 B2 * | 2/2012 | Bahattab | .............. | C09D 175/04 |
| | | | | 523/332 |
| 2006/0046068 A1 * | 3/2006 | Barancyk | ................. | C08J 7/042 |
| | | | | 428/423.1 |
| 2012/0065309 A1 | 3/2012 | Argrawal et al. | | |
| 2013/0158210 A1 * | 6/2013 | Hossain | ............. | C08G 18/3893 |
| | | | | 525/457 |
| 2015/0114472 A1 | 4/2015 | Kranbuehl et al. | | |
| 2016/0046771 A1 * | 2/2016 | Thibodeau | ............ | C08F 292/00 |
| | | | | 525/329.3 |
| 2018/0174700 A1 * | 6/2018 | McInnis | ................... | H01B 1/24 |

FOREIGN PATENT DOCUMENTS

| | | | | |
|---|---|---|---|---|
| CN | 1766019 A | 5/2006 | | |
| CN | 107474218 A | * 12/2017 | ............ | C08G 18/10 |
| WO | 2019008381 A1 | 1/2019 | | |
| WO | 2019140447 A1 | 7/2019 | | |

OTHER PUBLICATIONS

Machine translation of CN 107474218 A, published Dec. 15, 2017. (Year: 2017).*
Gosh, et al. "Studies of Thermal and Mechanical Properties of Epoxy-Silicon Oxxide Hybrid Materials" JNEPEG (published Oct. 8, 2015) 24:4440-4448.
Jiang, et al. "Effects of Surface-modified silica nanoparticles attached graphene oxide using isocyanate-terminated flexible polymer chains on the mechanical properties of epoxy composites" J. Mater. Chem A, 2014, 10557-10567.
Potts, et al. "Graphene-based polymer nanocomposites" Polymer; Available online Dec. 2, 2010, Elsevier.
Tripathi, et al. "Electrical and mechanical properties of PMMA/ reduced graphene oxide nanocomposites prepared via in situ" Journal of Materials Science; Sep. 2013, Published online May 14, 2013.
United States Patent and Trademark Office (ISA) International Search Report and Written Opinion for PCT/US2019/013676 dated Mar. 18, 2019, 12 pp.
Wang, et al. "In situ polymerization of graphene nanosheets and polyurethane with enhanced mechanical and thermal properties" J. Mater. Chem., 2011, 21, 4222-4227.
Yu, et al. "Enhanced thermal and mechanical properties of functionalized graphene/thiol-ene systems by photopolymerization technology; Chemical Engineering Journal" May 15, 2013.

* cited by examiner

*Primary Examiner* — Vickey Nerangis
(74) *Attorney, Agent, or Firm* — Bulkley, Richardson and Gelinas, LLP; Mary R. Bonzagni, Esq.

(57) ABSTRACT

Method of producing a high strength (with improved tensile strength and elongation at break properties), high quality, cost effective, nanoparticle enhanced polyurea, polyurethane, and epoxy composites with chemical bonding into polymer backbone. The mechanical properties of tensile strength and elongation at break improves concurrently and significantly with tensile strength increasing well over 300%. The polymer/nanoparticle composite can be produced cost effectively as a high quality coating system or in nanoparticle concentrate forms.

22 Claims, 5 Drawing Sheets

ULTRA HIGH STRENGTH COATING AND COMPOSITES

CROSS-REFERENCE TO RELATED APPLICATIONS

This application is the National Stage of International Application No. PCT/US2019/013676, filed on Jan. 15, 2019 claiming the priority of 62/617,476 filed on Jan. 15, 2018, the content of each of which is incorporated by reference herein.

TECHNICAL FIELD OF THE INVENTION

The present invention relates in general to the field of ultra high strength adhesives, coatings and composites.

BACKGROUND OF THE INVENTION

Without limiting the scope of the invention, its background is described in connection with composite materials.

Polyurea is known to be a polymer that is a durable tough coating. Polyurea is a type of elastomer that is derived from isocyanate resin blend obtained through step growth polymerization or alternatively the polyurea/polyurethane reaction may be obtained through cyclo/cyclic carbonates, polycyclic carbonates, and/or a multi functional cyclic carbonates based component through various polymerization methods. The isocyanate can be aromatic or aliphatic in nature and use a polymerization termination agent of either an amine (in the case of polyurea) or a hydroxyl functional group (in the case of polyurethane). Any remaining hydroxyls after the polymeric reaction are the result of incomplete conversion to the amine-terminated polymer resins in the case of polyurea. Polyurea reacted with an aromatic isocyanate component is known to have a significant service life issue; that issue is that it degrades with exposure to ultra violet light. Polyurethanes, whether aliphatic or aromatic, are also known to have a significant service life issue if the exposure is to the outdoors or any location that permits the polyurethane to be exposed to cycles of water and ultra violet radiation. This issue is known as hydrolytic instability.

Polyurea is made from alternating monomers/prepolymers or of substantially all prepolymer, depending upon the formulation, of isocyanates and amines that react with each other to form urea molecular chains and networks. Ureas can also be formed from the reaction of isocyanates with water resulting in a carbamic acid. This carbamic acid decomposes by splitting off carbon dioxide and leaving behind an amine. The amine is then able to react with another isocyanate group to form the polyurea. The carbon dioxide that is liberated in this reaction is one of the primary blowing (foaming) agent in many waterborne polyurethane/urea foams.

Graphene is an allotrope of carbon. Graphene's structure is a one-atom-thick planar sheet of $sp^2$-bonded carbon atoms that are densely packed in a honeycomb or hexagonal crystal lattice. The $sp^2$ orbitals make graphene and edge-oxidized graphene one of the most electrical and thermally conductive materials in the world. The electrical resistivity is less than copper ($\ll 1.72 \times 10^{-6}$ Ω-cm), hole mobility between 200-1900 $cm^2$/V-s thermal conductivity of 3000-5000 W/mK and photo generated carriers recombining in <1 ps. These electrical and thermal attributes make graphene and graphene oxide potentially an outstanding additive to reduce the damaging effects of UV exposure to polymers and in particular polyurea.

Graphene is also one of the strongest materials ever tested. Measurements have shown that graphene has a breaking strength 200 times greater than steel, with a tensile modulus (stiffness) of 1 TPa (150,000,000 psi). The carbon-carbon bond length in graphene is about 1.42 Å. Graphene sheets stack to form graphite with an inter-planar spacing of 3.35 Å. Multiple graphene sheets/flakes are bonded together by van der Waals forces. Hummers derived graphene oxide has an inter-planar spacing of 6 Å. Graphene oxide made by Garmor's edge oxidation process has an inter-planar spacing of 3.35 Å producing an oxidized product that can react with polymers/monomers/chemicals through the edge functionalization/oxidation.

Using strong oxidizers such as sulfuric and nitric acids result in a graphene oxide with texturing and folding of the individual sheets/flakes and the loss of carboxylic group functionality. The products of this synthesis technique are graphite/graphene oxide. Separating the strong oxidizer reactants from the products is a time consuming and expensive process. The graphene/graphite oxide, without the strong oxidizers, has an oxygen content ranging between 1 and 50 wt %. Graphite/Graphene oxide contains oxygen attached to the layers as both epoxy bridges and hydroxyl groups (—COOH). The oxidized graphene/graphite is hydrophilic.

Zhou, et al., Graphene oxide/polyurethane-based solid-solid phase change materials with enhanced mechanical properties, Thermochimica Acta, Volume 658, 10 Dec. 2017, Pages 38-46. These authors state, "Besides, the tensile strength increased to 21.7 from 10.2 MPa with 14.5 wt ‰ GO and Young's modulus increased to 471.5 from 180.1 MPa for 44.6 wt ‰ one. Also, the strain at break has a slight promotion within 14.5 wt ‰ GO."

Zhamu et al, U.S. Pat. No. 8,652,362 B2, Nano Graphene-Modified Curing Agents for Thermosetting Resins, teach a modified curing agent for a thermosetting resin, such as epoxy resin. As one example, the epoxy curing agent is said to comprise: (a) multiple nano graphene platelets; (b) a chemical functional group having multiple ends with a first end being bonded to a nano graphene platelet and at least a second end reactive with the epoxy resin; and (c) reactive molecules acting as a primary cross-linking agent for the epoxy resin; wherein the nano graphene platelet content is no less than 0.01% by weight based on the total weight of the modified curing agent.

Naskar, U.S. Pat. No. 9,453,129 B2, Polymer Blend Composition and Method of Preparation, teaches composition and method that include a polymer blend material comprising: (i) a first polymer containing hydrogen bond donating groups having at least one hydrogen atom bound to a heteroatom selected from oxygen, nitrogen, and sulfur, or an anionic version of said first polymer wherein at least a portion of hydrogen atoms bound to a heteroatom is absent and replaced with at least one electron pair; (ii) a second polymer containing hydrogen bond accepting groups selected from nitrile, halogen, and ether functional groups; and (iii) at least one modifying agent selected from carbon particles, ether-containing polymers, and Lewis acid compounds; wherein, if said second polymer contains ether functional groups, then said at least one modifying agent is selected from carbon particles and Lewis acid compounds.

Qian, et al., One-pot surface functionalization and reduction of graphene oxide with long-chain molecules: Preparation and its enhancement on the thermal and mechanical properties of polyuria. Chemical Engineering Journal, Volume 236, 15 Jan. 2014, Pages 233-241. These authors state that, "[t]he results from FTIR, XPS and XRD showed that amine-terminated polyether was successfully attached onto the surface of FGO (functionalized graphene oxide) and most of FGO was reduced. Subsequently the amine-terminated polyether functionalized GO sheets were covalently incorporated into the polyurea matrix via in situ polymerization . . . . Furthermore, the tensile test indicated that the FGO could also improve tensile properties of polyurea. It is believed that the reduction and covalent functionalization of graphene can improve both the dispersion of FGO in the polymer matrix and the interfacial interactions between FGO and polyurea matrix."

Qian, et al., Graphite oxide/polyurea and graphene/polyurea nanocomposites: A comparative investigation on properties reinforcements and mechanism, Composites Science & Technology, Volume 74, 24 Jan. 2013, Pages 228-234. These authors state, "As for the mechanical behaviors, 0.2 wt. of graphene in the nanocomposites achieved the maximum increase in the tensile strength (80%). However, the tensile properties of PUA/GO nanocomposites decreased with the increase of GO contents. Moreover, it was found that the carbonyl, epoxy and hydroxyl groups in the graphite oxide influence the molecular weights and weakened the hydrogen bonds among polyurea molecules and those resulted in the deduced (reduced) mechanical properties of polyurea."

Petrovic, et al., Structure and properties of polyurethane-silica nanocomposites J Appl Polym Sci 76: 133-151, 2000, teaches that nanocomposites displayed higher strength and elongation at break but lower density, modulus, and hardness than the corresponding micron-size silica-filled polyurethanes. Although the nanosilica showed a stronger interaction with the matrix, there were no dramatic differences in the dielectric behavior between the two series of composites.

SUMMARY OF THE INVENTION

In one embodiment, the present invention includes a method of creating a nanoparticle enhanced polymer composite comprising: (a) dispersing the nanoparticle using a sonicator or high speed mixer in an isocyanate monomer/prepolymer into a nanoparticle-isocyanate blend; and (b) reacting the nanoparticle-isocyanate blend with an amine blend to form a covalent bond between the nanoparticle and the polymer into a nanoparticle enhanced polymer. In one aspect, the nanoparticle-isocyanate blend is blended with an amine, polyol or phenolic polymer/prepolymer to produce a polymer. In another aspect, the nanoparticle is graphene oxide with an oxidation level greater than 0.1% and less than 55%, and the polymerization is to an edge of the graphene oxide. In another aspect, the nanoparticle is a silicon oxide particle with an oxidation level greater than 0.1% and less than 70%. In another aspect, the nanoparticle is a graphene oxide and is dispersed at a mass ratio greater than 0.01% and less than 80% to form nanoparticle-amine (e.g., resin—NH, OH, epoxide) concentrate. In another aspect, the nanoparticle is a graphene oxide and is dispersed at a mass ratio greater than 0.01% and less than 80% to form a nanoparticle-isocyanate concentrate. In another aspect, the nanoparticle is silicon oxide and is dispersed at a mass ratio greater than 0.01% and less than 80% to form a nanoparticle-amine (e.g., resin—NH, OH, epoxide) concentrate. In another aspect, the nanoparticle is silicon oxide and is dispersed at a mass ratio greater than 0.01% and less than 80% to form a nanoparticle-isocyanate concentrate. In another aspect, the graphene oxide has a flake diameter to thickness ratio greater than 1 µm and less than 100,000 µm. In another aspect, the silicon oxide particle has diameter of greater than 0.001 µm and less than 100 µm. In another aspect, the method further comprises polymerizing the nanoparticle-isocyanate blend in a porous material to increase its strength in at least one dimension, and the increase in strength is at least 15, 17, 19, 20, 25, 30, 35, 40, 45, 50, 60, 75, 77, 80, 85, 90, 95, 100, 125, 150, 175, 200, 300, or 390 percent. In another aspect, the porous material is natural or artificial, or selected from marble, tiles, bricks, masonry, concrete, granite, repair mortar, artificial granite, breeze block, capping stone, glass, fiberglass, hardened roof tiles, and ceramic materials. In another aspect, the adhesion of the polymer to a porous material is over 200, 250, 300, 500, 900, and 1,050 psi.

In another embodiment, the present invention includes A method of creating a nanoparticle enhanced polymer composite comprising: selecting an amine, a polyol, or a phenolic monomer/prepolymer blend that does not set with a selected isocyanate in 30 seconds; dispersing the nanoparticle using a sonicator or high speed mixer in with at least one of an amine, a polyol, or a phenolic monomer/prepolymer into a non-reacted nanoparticle-amine blend suspension; and forming the nanoparticle enhanced polymer. In another aspect, the nanoparticle is graphene oxide with an oxidation level greater than 0.1% and less than 55%, and the polymerization is to an edge of the graphene oxide. In another aspect, the nanoparticle is a silicon oxide particle with an oxidation level greater than 0.1% and less than 100%. In another aspect, the nanoparticle is a graphene oxide and is dispersed at a mass ratio greater than 0.01% and less than 80% to form nanoparticle-amine concentrate. In another aspect, the nanoparticle is a graphene oxide and is dispersed at a mass ratio greater than 0.01% and less than 80% to form a nanoparticle-isocyanate concentrate. In another aspect, the nanoparticle is silicon oxide and is dispersed at a mass ratio greater than 0.01% and less than 80% to form a nanoparticle-isocyanate concentrate. In another aspect, the nanoparticle is silicon oxide and is dispersed at a mass ratio greater than 0.01% and less than 80% to form nanoparticle-amine concentrate. In another aspect, the graphene oxide has a flake diameter to thickness ratio greater than 1 µm and less than 100,000 µm. In another aspect, the silicon oxide particle has diameter to greater than 0.001 µm and less than 100 µm. In another aspect, the isocyanate concentrate is let down or diluted by additional amine-blend to the desired loading, then combined with an isocyanate to form a polymer composite. In another aspect, the nanoparticle forms a covalent bond with a polymeric host. In another aspect, the amine concentrate is let down or diluted by additional amine-blend to the desired loading, then combined with an amine to form a polymer composite. In another aspect, the nanoparticle forms a covalent bond with the polymeric host. In another aspect, the nanoparticle oxidation is comprised of one or more of the following: hydroxyl, carboxylic or epoxide. In another aspect, the nanoparticle is a coating or intrinsic to the particle. In another aspect, the method further comprises polymerizing the nanoparticle-amine, polyol and/or phenolic monomer/prepolymer blend in a porous material to increase its strength in at least one dimension, and the increase in strength is at least 15, 17, 19, 25, 30, 35, 50, 75, 77, 80, 85, 90, 95, 100, 125, 150, 175, 200, 300, 400, 500, 600, 700, 800, 900, 1,000, or 1,050 percent. In another aspect, the porous material is natural or artificial, or selected from marble, tiles, bricks, masonry, granite, repair mortar, artificial granite, breeze block, capping stone, concrete, hardened roof tiles, glass, fiberglass, and ceramic materials. In another aspect, the adhesion of the polymer material to a porous material is over 200, 250, 300, 500, 900, and 1,050 psi.

In another embodiment, the present invention includes a formulation comprising a reactive nanoparticle concentrate selected from silicon oxide or graphene oxide that is dispersed at a mass ratio greater than 0.01% and less than 80% to form a nanoparticle-amine (e.g., resin—NH, OH, epoxide) concentrate or a nanoparticle-isocyanate concentrate. In one aspect, the nanoparticle-isocyanate blend is blended with an amine, polyol or phenolic polymer/prepolymer to produce a polymer. In another aspect, the nanoparticle is graphene oxide with an oxidation level greater than 0.1% and less than 55%, and the polymerization is to an edge of the graphene oxide. In another aspect, the nanoparticle is a silicon oxide particle with an oxidation level greater than 0.1% and less than 70%. In another aspect, the nanoparticle is a graphene oxide and is dispersed at a mass ratio greater than 0.01% and less than 80% to form nanoparticle-amine (e.g., resin—NH, OH, epoxide) concentrate. In another aspect, the nanoparticle is a graphene oxide and is dispersed at a mass ratio greater than 0.01% and less than 80% to form a nanoparticle-isocyanate concentrate. In another aspect, the nanoparticle is silicon oxide and is dispersed at a mass ratio greater than 0.01% and less than 80% to form a nanoparticle-amine (resin—NH, OH, epoxide) concentrate. In another aspect, the nanoparticle is silicon oxide and is dispersed at a mass ratio greater than 0.01% and less than 80% to form a nanoparticle-isocyanate concentrate. In another aspect, the graphene oxide has a flake diameter to thickness ratio greater than 1 μm and less than 100,000 μm. In another aspect, the silicon oxide particle has diameter to greater than 0.001 μm and less than 100 μm. In another aspect, the method further comprises polymerizing the nanoparticle-isocyanate blend in a porous material to increase its strength in at least one dimension, and the increase in strength is at least 15, 17, 19, 20, 25, 30, 35, 40, 45, 50, 60, 75, 77, 80, 85, 90, 95, 100, 125, 150, 175, 200, or 300 percent. In another aspect, the porous material is natural or artificial, or selected from marble, tiles, bricks, masonry, concrete, granite, repair mortar, artificial granite, breeze block, capping stone, glass, fiberglass, hardened roof tiles, and ceramic materials. In another aspect, the adhesion of the polymer to a porous material is over 200, 250, 300, 500, 900, and 1,050 psi.

In another embodiment, the present invention includes a coating comprising a reactive nanoparticle selected from silicon oxide or graphene oxide that is dispersed at a mass ratio greater than 0.01% and less than 80% and polymerized into a nanoparticle-amine (e.g., resin—NH, OH, epoxide) polymer or a nanoparticle-isocyanate polymer, wherein the polymer has a simultaneous increase in both elongation and tensile strength. In one aspect, the nanoparticle-isocyanate blend is blended with an amine, polyol or phenolic polymer/prepolymer to produce a polymer. In another aspect, the nanoparticle is graphene oxide with an oxidation level greater than 0.1% and less than 55%, and the polymerization is to an edge of the graphene oxide. In another aspect, the nanoparticle is a silicon oxide particle with an oxidation level greater than 0.1% and less than 70%. In another aspect, the nanoparticle is a graphene oxide and is dispersed at a mass ratio greater than 0.01% and less than 80% to form nanoparticle-amine (e.g., resin—NH, OH, epoxide) concentrate. In another aspect, the nanoparticle is a graphene oxide and is dispersed at a mass ratio greater than 0.01% and less than 80% to form a nanoparticle-isocyanate concentrate. In another aspect, the nanoparticle is silicon oxide and is dispersed at a mass ratio greater than 0.01% and less than 80% to form a nanoparticle-amine (resin—NH, OH, epoxide) concentrate. In another aspect, the nanoparticle is silicon oxide and is dispersed at a mass ratio greater than 0.01% and less than 80% to form a nanoparticle-isocyanate concentrate. In another aspect, the graphene oxide has a flake diameter to thickness ratio greater than 1 μm and less than 100,000 μm. In another aspect, the silicon oxide particle has diameter to greater than 0.001 μm and less than 100 μm. In another aspect, the method further comprises polymerizing the nanoparticle-isocyanate blend in a porous material to increase its strength in at least one dimension, and the increase in strength is at least 15, 17, 19, 20, 25, 30, 35, 40, 45, 50, 60, 75, 77, 80, 85, 90, 95, 100, 125, 150, 175, 200, or 300 percent. In another aspect, the porous material is natural or artificial, or selected from marble, tiles, bricks, masonry, granite, repair mortar, artificial granite, breeze block, capping stone, concrete, glass, fiberglass, hardened roof tiles, and ceramic materials. In another aspect, the adhesion of the polymer to a porous material is over 200, 250, 300, 500, 900, and 1,050 psi.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
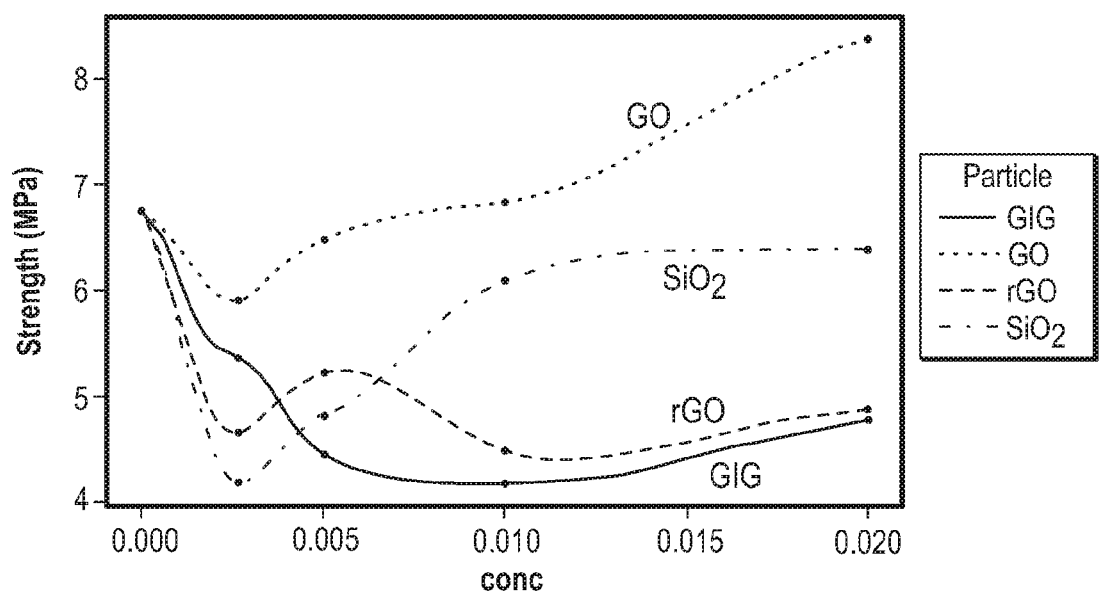
FIG. 1 is a graph that shows the mechanical enhancement of polyurea/GO composites and polyurea/rGO composites and polyurea/SiO$_2$ composites.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

As used herein, the term "polyurea" refers to any such OH (hydroxyl) functional material and/or NH (amino) functional material that reacts with an NCO (isocyanate) functionality and/or other functionality as discussed above to produce a polymeric chain of repeating units of OH/NH and the NCO/alternative functionality as referenced above. This will, by reference, specifically include polyurea; polyurea/polyurethane; polyurethane; epoxy; polyurea hybrids; polyurethane hybrids, and epoxy hybrids.

As used herein, the term "isocyanate", in addition to the reaction caused by an isocyanate or isocyanine itself, refers to the polyurea/polyurethane reaction that may be obtained through the use of cyclo/cyclic carbonates, polycyclic carbonates, and/or a multi functional cyclic carbonates based component, which may be derived through various polymerization methods, as a substitution for the partial or total use of the isocyanate component as is known in the art.

In general, additives, are added to a polymeric system during a melt blending or polymerization process. However, in a coating polymer system additives are usually added either after the polymerization process is completed but still in the vessel or as a "post-add" process. There are two types of additives, non-functional and functional. Non-functional additives impart benefits of volume or lower cost but generally not property increases other than incidental benefits—like inorganic fillers increase hardness. Functional additives impart specific benefits like slip; gloss level; ease of dispersability; reduction in surface defects, etc. However, neither non-functional, nor functional additives become part of the polymer chain unless reactive sites are present on the filler either naturally occurring or synthetically produced. Additives, for the purpose of this discussion are those materials that do not become part of the polymeric backbone chain/matrix, but are, dispersed and suspended in the polymeric material prior to the polymer reaction and located in the interstitial spaces between the polymeric chain/matrix. Traditionally this is how color additive such as carbon black is added to achieve a modest improvement in strength (mechanical properties), black color and electrical conductivity. Additives compounded into a polymer using melt blending or other polymerization methods, with the additives fairly uniformly suspended, end up between the polymer layers or chains and act like little springs, high tensile strength structures acting like small support structures improving hardness, or support structures distributing the load. If you add too much of most additives, you will form additive agglomerates that create point defects (polymeric chain crosslinking voids) and dramatically weaken the polymer composite resulting in reduction of physical properties or even catastrophic failures. Additives compounded into a polymer by this technical approach generally achieve a mechanical enhancement (tensile strength) of between 20% and 80% at loading levels from a few percent to a few tens of percent by weight while simultaneously reducing elongation properties. When additive(s) are introduced into the polymer through an in situ polymerization process the additive can react with the monomer/prepolymer of the host polymer. This form of compounding an additive into a polymer has shown the enhancement of the mechanical properties of over 200%. The large increase in the mechanical properties is due to covalent bonding between the additive(s) and the monomer/prepolymer of the host material. This reaction can only happen if the additive has been functionalized or naturally possesses reactive sites with which the host material can react with a termination of part of the monomer/prepolymer of the host.

The present invention includes compositions and method of producing a high strength (with improved tensile strength and elongation at break properties), high quality, cost effective, nanoparticle enhanced polyurea, polyurethane, and epoxy composites with chemical bonding into polymer backbone. The mechanical properties of tensile strength and elongation at break improves concurrently and significantly with tensile strength increasing well over 10, 12, 15, 17, 19, 20, 25, 30, 35, 40, 45, 50, 60, 75, 77, 80, 85, 90, 95, 100, 125, 150, 175, 200, or 300%. In certain embodiments, the increase in tensile strength can be from 15-50%, 20-75%, 30-100%, 50-150%, 200-250%, 100-300%, or greater than 300%. The adhesion of the polymer material of the present invention to a porous material is over 200, 250, 300, 500, 900, and 1,050 psi. The polymer/nanoparticle composite can be produced cost effectively as a high quality coating system or in nanoparticle concentrate forms. In certain embodiments, the graphene oxide is reacted to the edges of graphene oxide and not on the surface of the graphene oxide, e.g., the edges of graphene oxide flakes or platelets, wherein the oxidation level of the edges of the graphene oxide flakes is between 1 and 10% of the surface.

Figure 2:
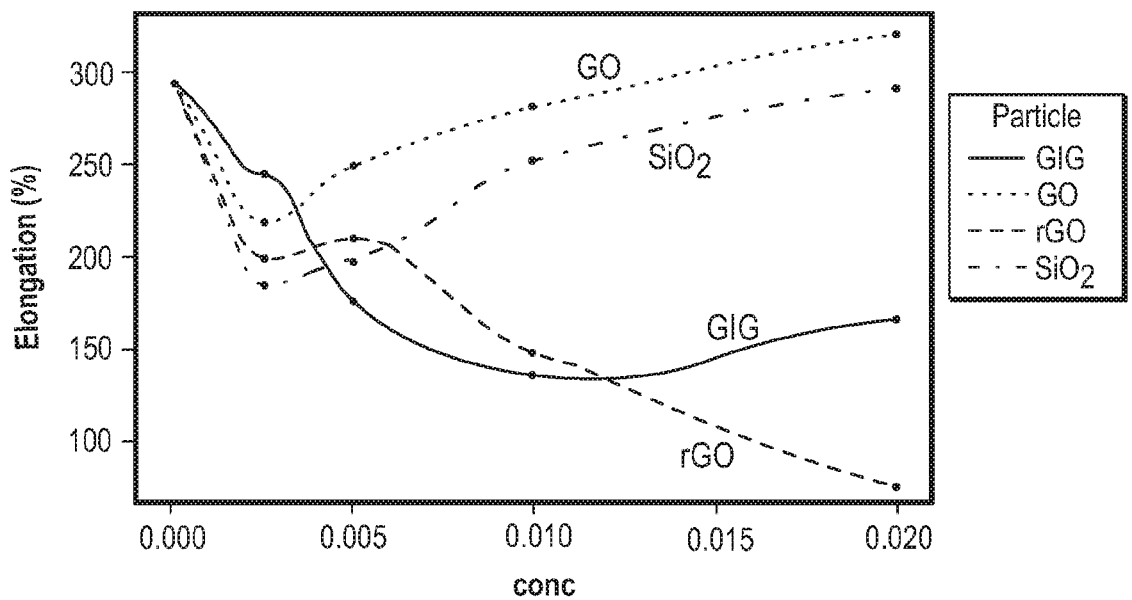
FIG. 2 is a graph that shows percentage increase in elongation at break for polyurea/GO composites and polyurea/rGO composites and polyurea/SiO$_2$ composites.
Figure 3:
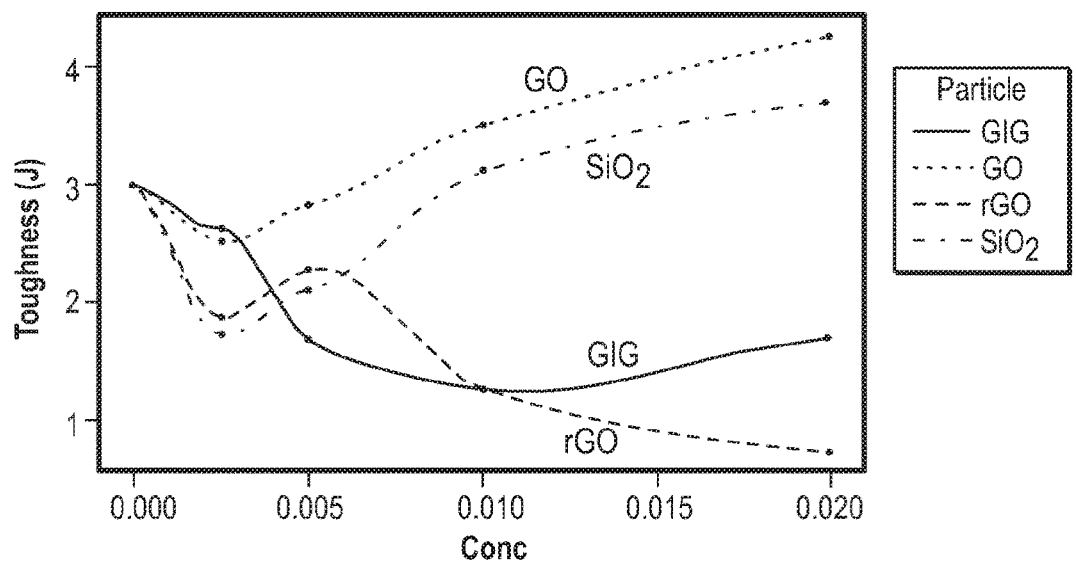
FIG. 3 is a graph that shows increase in toughness of polyurea/GO composites and polyurea/rGO composites and polyurea/SiO$_2$ composites.
Figure 4:
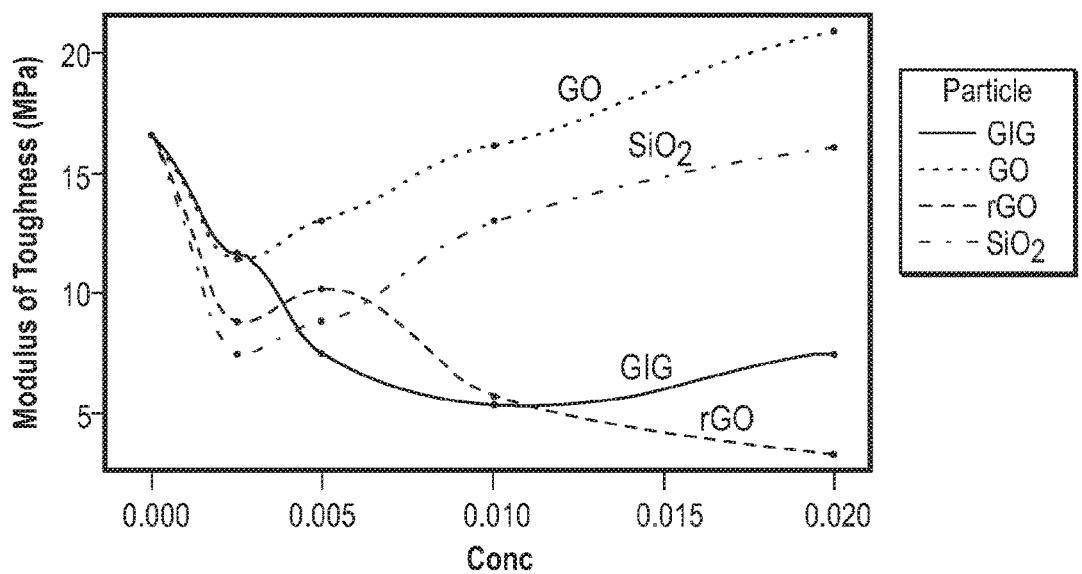
FIG. 4 is a graph that shows increase in the modules of toughness of polyurea/GO composites and polyurea/rGO composites and polyurea/SiO$_2$ composites.

Certain graphene oxide, such as those produced by Garmor Inc., have an oxidation level between 4% and 10%. The oxidation results in both COOH or OH termination/functional groups on the GO. When made chemically available to the Isocyanate monomer/prepolymer, it will react and become covalently bonded. Using a Graphene Oxide with higher oxidation levels will result in a solid matrix material that will not further react with other molecules such as amines or water. Using the mildly oxidized/functionalized graphene oxide allows sufficient unreacted Isocyanate monomers/prepolymers that when combined with amines or polyamines will react and form a Polyurea graphene oxide composite where the graphene oxide is covalently bonded into the molecular chain of the polymer. This can readily be seen in the FIG. 1 that shows 8 MPa in tensile strength. Simultaneously, FIG. 2 shows a large improvement in enhancement elongation. The results shows a 394% improvement in tensile strength simultaneously with achieving >50% enhancement in the elongation to break, relative to the neat or undoped (no Graphene Oxide added) Polyurea. The possibility of simultaneous increase in tensile strength and elongation was not previously known and is not expected in Newtonian mechanics/physics. Achieving enhancement elongation to break and tensile strength is only possible if the GO additive forms covalent bonds with the Isocyanate monomer/prepolymer prior to the reaction of the amine to form the GO-Polyurea composite. This can be further seen by the poor performance of the reduced graphene oxide. The reduced graphene oxide has an oxidation level less than 1% by weight and as such has virtually no functional groups to react with the Isocyanate monomer/prepolymer prior to forming the rGO-Polyurea composite. This can be seen in FIGS. 1 and 2. The figures show that there is a modest improvement in tensile strength and a reduction in elongation to break. The performance of rGO as an additive shows that it is floating between the polymer layers interstitially and not covalently bonded to the polymer. Likewise, the present invention also includes the use of $SiO_x$ in place of GO. Using different $SiO_x$s and in combination with other types of oxides, its possible to obtain polymeric materials having a wide variety of colors, including translucent and clear. Non-limiting, exemplary applications of the use of $SiO_x$ are shown using $SiO_2$.

GO, rGO, and $SiO_x$ can be used as an additive to polymers to form composites. However, while many nanoparticles can be added to a polymer to form a composite, only specific functionalized nanoparticle's may be added into a specific host polymer to form a covalently bonded composite. GO, and $SiO_x$ can be used as a reactive additive to polyurea elastomers and other polymers. The level of oxidation, as is demonstrated in the figures, shows that a minimum level of oxidation or functionalization that is compatible with the host polymer is required to form the covalent bond. The rGO has an oxidation level of ~1% while the GO has an oxidation level of ~5%. The average flake diameter is ~0.5 μm in diameter and less than 5 nm thick. The method of covalently binding the reactive additive(s) of the present invention into the host material varies. A first method is that the graphene oxide and/or reduced graphene oxide and/or silicon oxide nanoparticles are dispersed into Isocyanate monomer/prepolymer of the polyurea using a high-speed shearing mixer, under $N_2$ (nitrogen) to eliminate moisture contamination of the isocyanate, where the mixer operated at a rate of at least 300 rpm for at least 5 minutes. A mixing blade that minimizes the shear forces operating directly on the nanoparticle must be used to minimize any loss of functionality or damage to the nanoparticle. Then, at that point, the amine blend of the polyurea formulation was mixed with the GO/Part A through a static mixer. When the GO is added into the Part A NCO side, no time is required to obtain a covalent bond since the reaction with the GO and NCO has already taken place. When the GO is made into a dispersion with the resin side, then it takes a minimum 30-45 seconds for the GO to react with the NCO after the NCO and resin has been mixed together. The GO/polyurea was then poured onto a Film Applicator drawdown sheet leveled to a precise thickness with the Film Applicator and allowed to cure, and was then tested. Different GO loadings were used to evaluate the properties of the resulting GO/polyurea composite. Typically, the rpm is determined by the viscosity of the materials; the viscosity may be reduced through thermal heating of the materials, if desired, to reduce the required rpm of the mixer. The results can be seen in FIGS. 1-4. The results show a greater than 394% increase in tensile strength for the GO (2%)/polyurea composite. While the rGO(2%)/polyurea showed a ~15% improvement. All composite studies used the same preparation and testing protocols (pursuant to ASTM D-412) with the only difference being the oxidation level between the rGO and GO additive. A second method is to add the nanoparticles into the resin (amine or polyol) side of the material through sonication (horn or bath) or with a high speed low shear mixer (Silverson type of mixing technology) to create a stable, homogeneous mixture of uniform dispersion and then allow the dispersed nanoparticles to "compete with" the available NCO reactive sites when the side A and side B are mixed together either through a static mixer or through simple mixing. The skilled formulator can adjust the index of the formulation to ensure that there are adequate NCO reactive sites available to obtain a nanoparticle covalent bond into the backbone of the NCO—$NH_2$ or NCO—OH matrix.

Silicon oxide ($SiO_2$) nanopowder is an inorganic particle available in two structures: the P-type are porous particles with a nano-pore rate of approximately 0.5-0.7 ml/g and a comparatively high SSA (Specific Surface Area) and the S-type are spherical structures, non-porous, has a SSA of only SSA is ~170-200 $m^2/g$ but possesses a large number of hydroxyl groups and unsaturated residual bonds on its surface, and thereby provides the noted difference from the recognized steady state of the silicon oxide structure. The hydroxyl groups on the surface area of the $SiO_x$ (silicon oxide nanoparticle) provide the mechanism necessary for isocyanate related chemical reactions to occur that possess covalent bonding. Thus, like with GO, $SiO_{x/2}$ can be added to a polymer to form a composite, only specific functionalized nanoparticles may be added into a specific host polymer to form a covalently bonded composite. $SiO_{x/2}$ can be used as a reactive additive to polyurea elastomers and other polymers. The level of oxidation is sufficient for functionalization that is compatible with the host polymer is required to form the covalent bond. The $SiO_{x/2}$ has an oxidation level of ~1% up to ~5%. The average diameter of an $SiO_{x/2}$ nanoparticle can be ~0.5 μm and if in the form of a flake less than 5 nm thick. The method of covalently binding the reactive additive(s) of the present invention into the host material varies. A first method is that the graphene oxide and/or silicon oxide nanoparticles are dispersed into Isocyanate monomer/prepolymer of the polyurea using a high-speed shearing mixer, under $N_2$ (nitrogen) to eliminate moisture contamination of the isocyanate, where the mixer operated at a rate of at least 300 rpm for at least 5 min. A mixing blade that minimizes the shear forces operating directly on the nanoparticle must be used to minimize any loss of functionality or damage to the nanoparticle. Then, at that point, the amine blend of the polyurea formulation was mixed with the $SiO_{x/2}$/Part A through a static mixer. The $SiO_{x/2}$/polyurea was then extruded through the static mixer directly onto a Film Applicator drawdown sheet leveled to a precise thickness with the Film Applicator and allowed to cure, and was then tested. Different $SiO_{x/2}$ loadings were used to evaluate the properties of the resulting $SiO_{x/2}$/polyurea composite. Typically, the rpm is determined by the viscosity of the materials; the viscosity may be reduced through thermal heating of the materials, if desired, to reduce the required rpm of the mixer. Like in the example above, a significant simultaneous increase in tensile strength and elongation is found. All composite studies used the same preparation and testing protocols (pursuant to ASTM D-412) with the only difference being the add rate level in the $SiO_{x/2}$ additive. A second method is to add the nanoparticles into the resin (amine or polyol) side of the material through sonication (horn or bath) or with a high speed low shear mixer (Silverson type of mixing technology) to create a stable, homogeneous mixture of uniform dispersion and then allow the dispersed nanoparticles to "compete with" the available NCO reactive sites when the side A and side B are mixed together. The skilled formulator can adjust the index of the formulation to ensure that there are adequate NCO reactive sites available to obtain a nanoparticle covalent bond into the backbone of the NCO—NH$_2$ or NCO—OH matrix. It is important to note that upon inspection it would appear that there is significant white space around the covalent bonding of a nanoparticle into a OH, NH, and epoxide functional polymer when that nanoparticle is SiO$_x$. The literature has some references to nanoparticles in polyurethane wherein there is a H donating reactive group where the H is tied to a O, N, etc., but not to a Si.

Therefore, there are similar, but not equivalent changes in physical and mechanical properties of tensile strength and elongation when obtaining covalent bonding into the SiO$_x$ as was seen when covalent bonding was present with the Graphene Oxide. These properties showed a higher elongation gain result of 80% compared to the neat or undoped polyurea, but a lower tensile strength gain of only 195% compared to the neat or undoped polyurea. The differences in the comparative increases in physical properties of various hydroxyl functional nanoparticles, whether synthetically modified to provide chemical functionalization of the nanoparticle or the natural occurrence of that hydroxyl functionalization on a nanoparticle is impacted by several factors. Among these factors are the hydroxyl reactive site availability (rate of reaction, quantity, and reactive site density of the surface area) to the isocyanate reactive material, the relative competition of the other OH and NH materials to the NCO—OH reaction, and molecular weights of the reactive materials GO and SiOX can be used as additives to polymers to form composites. They can be used as reactive additives to polyurea elastomers and other polymers. Another method of dispersing the additive (GO and/or SiOX) is to disperse the additive into the amine blend of the polyurea by using sonication mixing or homogenization where the water bath sonicator operating at an average temperature of 30 C, and at a minimum of 480 watts power, for 20 minutes, per 1800 ml; or a minimum of 5.33 watt minutes per ml. At that point the amine/GO blend was mixed with the Part A (isocyanate) through a static mixer with a minimum mixer discharge rate of 10 ml/sec. The GO/polyurea was extruded through the static mixer onto a Film Applicator drawdown sheet leveled to a precise thickness with the Film Applicator and allowed to cure, and was then tested. Different GO loadings were used to evaluate the properties of the resulting GO/polyurea composite. The results can be seen in FIG. 1 through FIG. 4. The results show a 394% increase in tensile strength for the GO (2%)/polyurea composite; a 195% increase in tensile strength for the SiOX (2%)/polyurea composite; and the rGO(2%)/polyurea showed a ~15% improvement. All composite studies used the same preparation and testing protocols (pursuant to ASTM D-412) with the only difference being the oxidation level between the rGO and GO additive. Different GO, rGO, and SiOX loadings were used to evaluate the properties of the resulting polyurea composites. The results can be seen in FIG. 1 through FIG. 4. The results show a greater 390% increase in tensile strength for the GO (2%)/polyurea composite. While the rGO(2%)/polyurea showed a ~15% improvement. Both composite studies used the same preparation and testing protocols with the only difference being the oxidation level between the rGO and GO additive.

Further work has shown that a concentrate of the isocyanate/GO greater than 50% loading by weight of GO to isocyanate can be made and used with the present invention. Due to the modest oxidation level of the GO the isocyanate will not be full reacted depending upon the equivalent weight of the NCO as anyone skilled in the art understands. This allows the user to make a GO concentrate using the isocyanate as the host material and then combine it with pristine/neat isocyanate to let down or dilute the GO concentrate into the isocyanate mixture to a level that will achieve the desired mechanical properties enhancement. The selection of lower equivalent weights, higher Fn, and lower viscosity NCO's are important in managing the processing of the concentrate material without encountering a semi-solid material. As a practical matter the inventors have shown that you can make a 50% GO/isocyanate concentrate and then subsequently dilute it with the addition of more neat isocyanate with low shear mixing to achieve a 2% GO/isocyanate final blend that was then combined at a 1 to 1 by volume ratio and an index over 1.0 with the amine blend (polyamine) portion to form a 2% GO/Polyurea composite. The ability to produce a concentrate that is easily shipped, then let down with a local source of isocyanate, and then combined with an amine or polyamine blend to form a GO-Polyurea composite from a GO concentrate has thus been achieved. As a practical matter the inventors have shown that you can also make a greater than 50% GO/resin (OH, NH, epoxide) concentrate and then subsequently dilute it with the addition of more neat resin with low shear mixing to achieve a 2% GO/resin final blend that was then combined at a 1 to 1 by volume ratio and an index over 1.0 with the isocyanate portion to form a 2% GO/Polyurea composite. While there is no covalent bond in the GO/resin blend concentrate until the NCO has been mixed in there is still value to working with the resin side and producing a shelf stable GO/resin dispersion concentrate that can then be used in isocyanate based polymer systems and non-isocyanate based polyurethanes, epoxies and polyureas, The ability to produce a concentrate that is easily shipped, then let down with a local source of resin, and then combined with an isocyanate to form a GO-Polyurea composite from a GO/resin concentrate has thus been achieved. A dispersion concentrate using the OH/NH B side resin material was also made. In some cases, the NCO as a host resin is preferred since by obtaining a covalent bond in the host resin of a dispersion concentrate, which greatly reduces, and in some cases, eliminates the possibility of settling, re-agglomeration, and the potential for exposure to people where the nanoparticle retains its small identity and retains the potential for exposure hazards.

For example, a nanoparticle dispersion concentrate was made in which the concentration level of the GO in the OH or NH functional resin exceeded 50% by weight. Concentrates in the NCO of 50% by weight and higher are possible but the maximum recommended concentration into the NCO is 50%. Exceeding 50% would most certainly limit the covalent bonding into the backbone polymeric matrix in a host polymer of isocyanate with a Fn of 2. If higher concentrations are desired then the user must use an isocyanate with a higher Fn such that the ability to obtain a covalent bond into the backbone is maintained. Higher concentrations are and have been achieved but only through the simultaneous reduction of the host polymer viscosity and reducing the rate of addition of the nanoparticle into the host polymer.

Processing of the nanoparticle dispersion concentrate is similar to the above process described excepting that it is recommended that at 300 rpm at ambient temperature no more than 4% by weight is added per minute to protect the dispersion from having both sites of a di-functional polymer component react which would then prevent the nanoparticle from gaining a covalent bond into the backbone of the polymeric matrix. The mixer will generally provide at least 2 axis of mixing while also providing a full pull-through of material.

GO can be used as an additive to polyurea elastomer and other polymers. Polyurea can be produced by combining an isocyanate (Part A) with an amine (—NH, —OH, or -epoxide) (Part B). Typically the two separate parts, A and B, are combined and then coated on to a cleaned surface. Other additives and resin components can be used to control the viscosity, curing rate, chemical and physical properties of the final coating.

Figure 5:
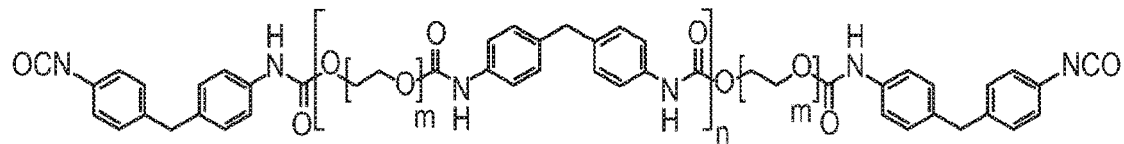
FIG. 5 shows the isocyanate molecular chain.
Figure 6:
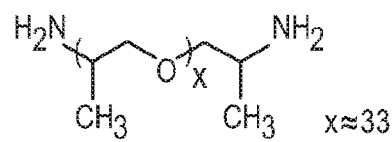
FIG. 6 shows typical amines molecular chain.
Figure 7:
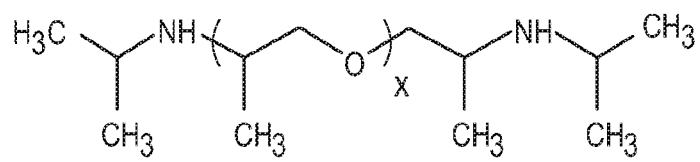
FIG. 7 shows longer secondary amines molecular chain.

The isocyanate component for both formulations referenced herein is a quasi-prepolymer containing 2,4'- and 4,4'-MDI isocyanates. While this is the only description of structure provided by the manufacturer, examination of patent information and physical properties suggests a probable structure can be seen in FIG. 5.

The initial prepolymer was most likely formed by reacting a polyether diol with a mixture of 2,4'- and 4,4'-MDI, where 4,4'-MDI most likely represents somewhere between 75%-90% (by wt.) of the isomeric mixture. The identity of the polyether diol is not disclosed by the manufacturer, but is likely a difunctional ethylene oxide-capped polyoxyethylene (based on viscosity data in patent examples). The quasi-prepolymer is formed by back blending the prepolymer with a mixture of 2,4'- and 4,4'-MDI (most likely now in a roughly 1:1 ratio) until the mixture has an NCO content of approximately 15%.

The nanoparticulate/nanoparticles are to be dispersed in isocyanate prepolymer/resin is placed into a concave-blade disc turbines for general dispersing mixing/blending prior to sonication. An appropriate choice is a simple propeller or helical ribbon mixer/blender. When powered mixing is employed, consideration should be given to the impeller used to mix the particulate matter into dispersion. Sufficiently high shear forces can have a destructive effect on the particulate material (e.g. affecting aspect ratio and Specific Surface Area). The nanoparticulate should be reasonably well dispersed in the host resin but should be visually inspected before sonication or two-directional mechanical mixing for indications of non-uniformity (e.g. creaming, flocculation agglomeration or sedimentation). After achieving what appears to be a uniform dispersion, place the container that has the amine/nanoparticulate suspension, into an ultrasonic bath or horn sonicator or mechanical disperser as discussed above for sonication/mixing. If the sonication bath is selected, it should operate at 50 W for less than an hour preferably, 20-30 minutes per liter of resin/particulate dispersion although different power to time ratios may be acceptable. The amine/nanoparticulate suspension is intended for use within a relatively short time frame (i.e. less than a few hours), from the sonication in the ultrasound bath. If flocculation (or non-uniform appearance) is observed, shake and/or re-mix the sample thoroughly, then repeat sonication or mechanical mixing.

Longer sonication times are required for suspensions that are not intended for immediate use. Longer sonication times may also be required for different mixtures or alternative additives, plus additional processing and material factors (e.g. concentration of the nanoparticulate material, extent of mixing prior to sonication, viscosity of the bulk media, composition and wall thickness of the mixing vessel).

Samples can be produced using a two-cartridge manual or pneumatic dispensing gun. Mount the two-component cartridge into the dispensing gun. Placing the Amine/nanoparticulate suspension into one cartridges of the dispersion gun and the Isocyanate in the other cartridge holder of the gun. The preferred cartridge volume for producing test samples is a standard cartridge containing up to 200 ml/cartridge. Use a hand-held manual or pneumatic two cartridge dispensing gun designed for the cartridge being used and extrude the two components through the static mixer at a rate sufficient to ensure uniform mixing on to a clean, level, static electric neutralized surface that will not allow bonding of the host resin system. Ensure that the correct push disks are equipped (sized according to cartridge diameter). Hold the gun upright so that the cartridge nozzle is pointed upwards. Remove the D-clips (or cap) from each side of the cartridge, and set them aside separately so there is no crossover in material if they are used to re-seal the cartridge at a later time. Then affix a static mixer to the nozzle of the two-component cartridge. Always discharge the first material through the static mixer until a uniform, fully mixed, extrusion flow is established.

Alternatively, samples can be prepared using a wide variety of 2 or more component dispensing cartridge sizes. Care needs to be taken that there are sufficient elements in the static mixer to properly and fully mix the materials to be tested. Also, the speed at which one extrudes the materials through the static mixer is important such that sufficient vortex/torque pressure is generated which is required to completely mix the materials together.

Materials from each barrel of the cartridge may enter the static mixer at different times; therefore, some of the first material to be extruded will be off-ratio and must be discarded into a waste container. The volume of discarded material should be roughly more than half the volume contained in the static mixer, although this may vary from case to case. For intermediate or large cartridges with a threaded nozzle, secure the static mixer by screwing on a cap nut (i.e. lock nut).

A flat, smooth-surfaced polypropylene (PP) sheet (substrate) is suitable for most purposes of creating a free-standing sample. Ensure that the PP sheet is thick enough so as not to warp or curl due to the exothermic nature of reactive materials. Place the substrate on a level-surface. Make sure the substrate has been cleaned with acetone, or another appropriate solvent for the substrate. Additionally, it is recommended that a grounded wire be used to discharge the static electricity from the surface of the substrate (particularly when the substrate is a PP sheet). Set the Film Applicator to the desire sample film thickness and thoroughly clean the applicator blade to eliminate any prior contamination. Place the Film Applicator on the substrate and proceed to the next step. The sample resulting from the Film Applicator will be in the form of a rectangular sheet, suitable to produce "dumbbell" or dog-bone specimens for testing in accordance with ASTM D-412. When the drawdown is complete, immediately remove the blade from the film applicator and clean it to remove the resin. The blade must be cleaned quickly, and thoroughly, before the material can adhere to the blade surface.

The resulting material was tested for its mechanical/physical deformative resistant properties (tensile strength and elongation) in accordance with ASTM D-412-16. As can be seen from FIGS. 1-4 there is a unique combination of dramatic increases both in the tensile strength and elongation to break properties. This can only happen if the nanoparticle (graphene oxide and silicone oxide (SiOX) additive has chemically reacted forming covalent bonds between the isocyanate of the host polyurea and the hydroxyl containing nanoparticle (GO, SiOX, or other).

Bonding incompatible materials (coatings) together such as hydroxyl functional coatings (epoxy, polyurethane, and polyurea) with carboxyl functional chemistries (MMA, acrylic, etc.) is a known problem. Acrylic urethanes, for example is a blend of carboxyl and hydroxyl species bonded together by van der wall forces and through intermixed polymeric chains but without direct chemical bonding unless a "transition" material/molecule is used.

As used herein, the term "transition" molecule refers to any molecule that has the capacity to chemically bond both of the otherwise incompatible polymeric reactive groups (e.g., hydroxyl, carboxyl, methyl, phenol, etc.) without using non-polymer chain bonding catalysts. An example of this is Polyaziridine PZ-28, from Polyaziridine, LLC, that while not having both hydroxyl and carboxyl functionality separately uses the aziridine chemistry to react with active H groups in both acrylic emulsion and polyurethane dispersions. Another example that does possess both hydroxyl groups and carboxyl groups but whose primary purpose in not bonding, but dispersing, is the K-Sperse 5100 from King Industries.

A concentrate of a GO/hydroxyl functional host resin or a concentrate of a GO/carboxyl functional host resin where the reactive groups resulting from oxidation/functionalization of the functionalized GO results in both available hydroxyl groups and available carboxyl groups will act as a transition molecule. Care needs to be taken regarding the stoichiometry to assure that both the hydroxyl functional polymer and the carboxyl functional polymer will both chemically bond to the GO and that only desired levels of preferential bonding is permitted. In this manner the formulator may control the rate of covalent bonding to the host polymer, whether it be hydroxyl, carboxyl, acrylate, epoxide or other and then also plan the rate of covalent bonding into the new polymer, whatever that reactive group may be (e.g. hydroxyl, carboxyl, acrylate, epoxide or other).

The present invention was used in a variety of implementations. Surprisingly, it was found during testing that not only does the tensile strength of the GO film increase, as would be expected (a thicker film is harder to elongate than a thinner one), but, the tensile strength of each mil increases as the film gets thicker. This is not true for the SiO film.

FIGS. 8-11 show the results demonstrating that the tensile strength of each mil of the GO composite increases while the SiO does not increase per mil, compared to the tensile strength of each mil of the undoped polyurea that, as expected, only increases in a linear relationship according to the % increase of the polymer film thickness. This result with the GO composite was not expected.

Figure 8:
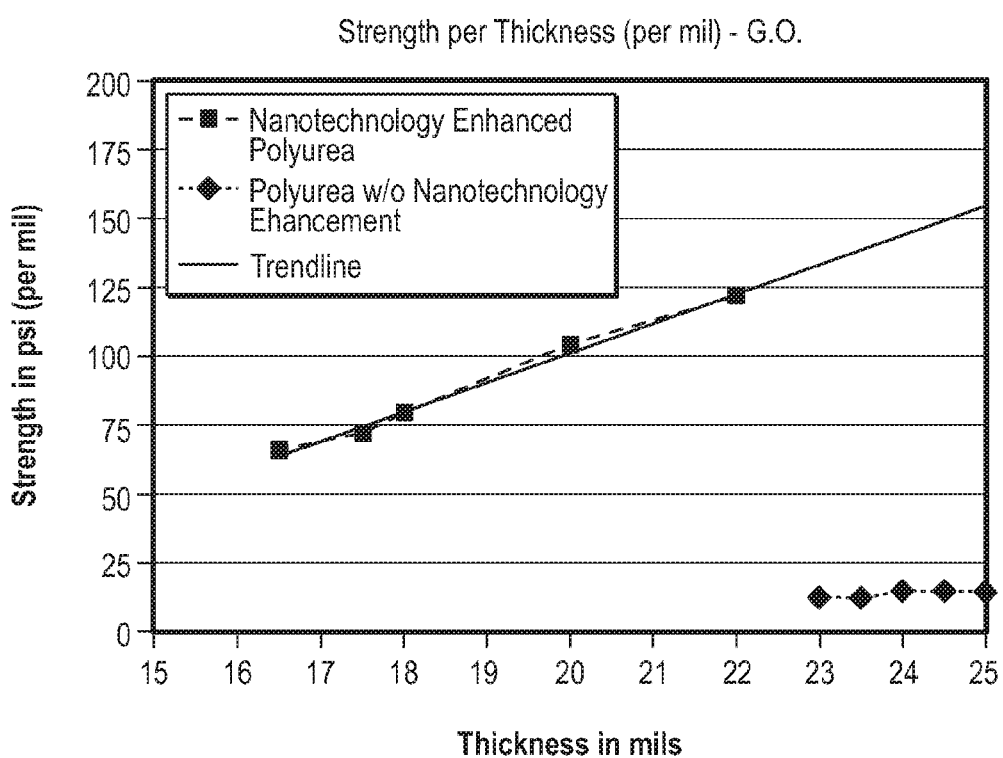
FIG. 8 is a graph that shows a comparison of the strength per thickness (per mil) using GO nanoenhanced polymeric urea of the present invention versus non-enhanced polyurea polymer.
Figure 9:
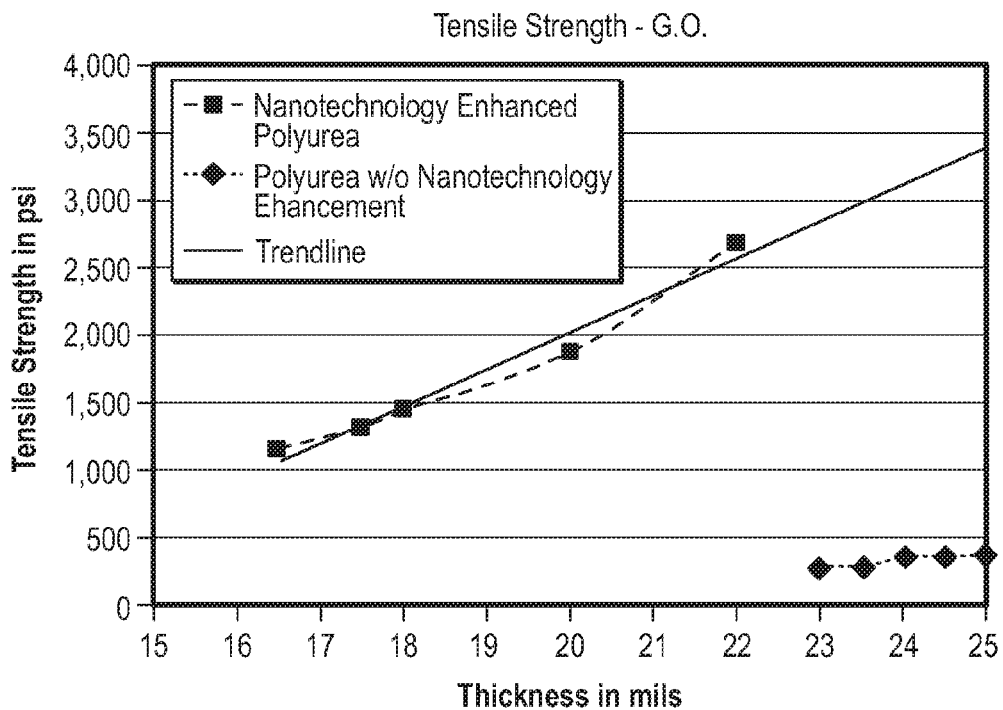
FIG. 9 is a graph that shows a comparison of the tensile strength per thickness (per mil) using GO nanoenhanced polymeric urea of the present invention versus non-enhanced polyurea polymer.

FIG. 8 is a graph that shows a comparison of the strength per thickness (per mil) using GO nanoenhanced polymeric polyurea of the present invention versus non-enhanced polyurea polymer. Surprisingly, significantly thinner polymers had, at a minimum, more than triple the strength, but that strength continued to size as the thickness was increased. FIG. 9 is a graph that shows a comparison of the tensile strength using GO nanoenhanced polymeric urea of the present invention versus non-enhanced polyurea polymer. Surprisingly, significantly thinner polymers had, at a minimum, more than about triple the tensile strength, but that strength continued to increase per ml as the thickness was increased non-linearly, which was not expected.

Figure 10:
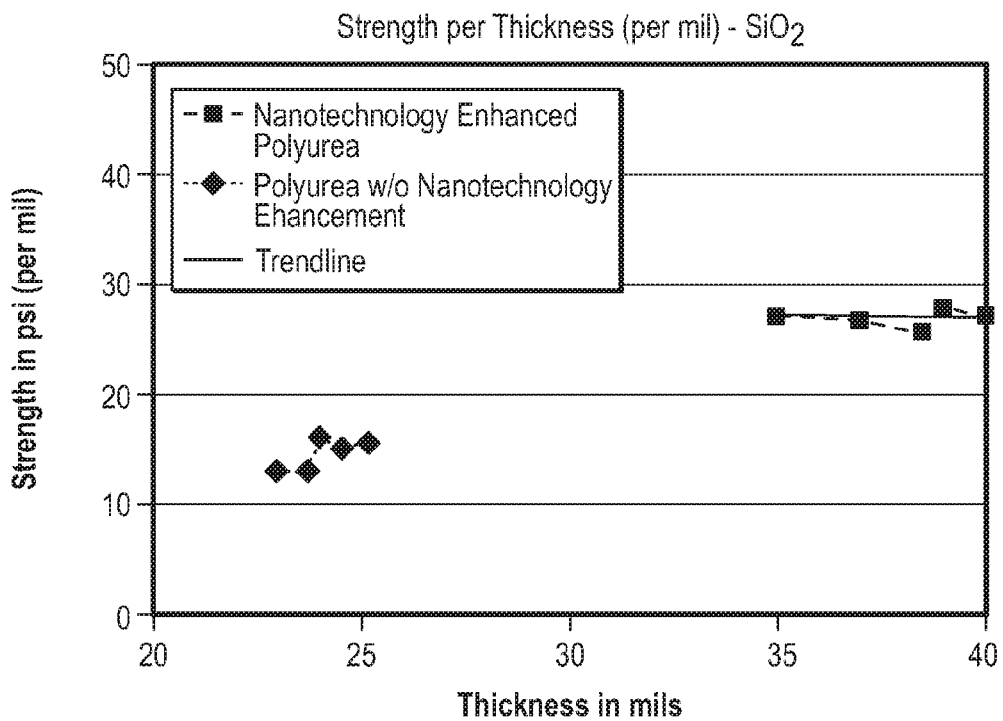
FIG. 10 is a graph that shows a comparison of the strength per thickness (per mil) using SiO$_2$ nanoenhanced polymeric urea of the present invention versus non-enhanced polyurea polymer.

FIG. 10 is a graph that shows a comparison of the strength per thickness (per mil) using $SiO_2$ nanoenhanced polyurea of the present invention versus non-enhanced polyurea polymer. Surprisingly, and contrary to the results with GO, while the nanoenhanced polymer had almost double the strength and that strength did not continue to increase compared to the undoped polymeric polyurea as the thickness was increased.

Figure 11:
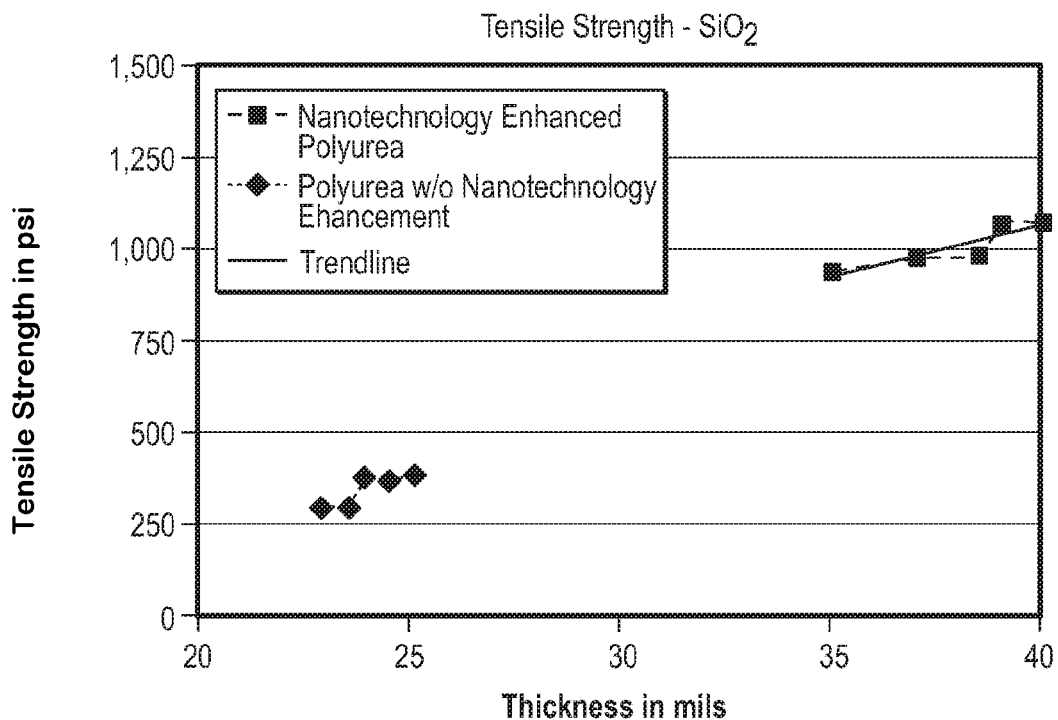
FIG. 11 is a graph that shows a comparison of the tensile strength per thickness (per mil) using SiO$_2$ nanoenhanced polymeric urea of the present invention versus non-enhanced polyurea polymer.

FIG. 11 is a graph that shows a comparison of the tensile strength using $SiO_2$ nanoenhanced polymeric urea of the present invention versus non-enhanced polyurea polymer. Surprisingly, contrary to what was seen with the GO/polyurea composite the $SiO_2$ nanoenhanced polymer, while having more than double the tensile strength, that strength only followed the increase in strength caused by a thicker nanoenhanced film.

Adhesion Testing—Strengthening Porous Materials.

Samples were tested in accordance with ASTM D4541, Standard Test Method for Pull-Off of Coatings Using Portable Adhesion Testers. On one test the surface of the marble was abraded with 60 grit abrasive sponge, and the polyurea graphene oxide composite with a 2% by weight graphene oxide, with 4-5% oxidation, was applied. On other tests the WATER CHASING® penetrating primer was used in addition to the abrasion preparation. DYNA-PRIME™ N-23 WATER CHASING® Primer (Creative Material Technologies, Ltd.) is a brushable/rollable grade of 100% solids polyurethane that has been that has been specially formulated as a high performance damp concrete primer. DYNA-PRIME® N-23 WATER CHASING® Primer penetrates deeply into wet porous substrates where it reacts chemically with the water, providing a vapor barrier. DYNA-PRIME N-23 seals damp concrete to allow ease of topcoat application. DYNA-PRIME™ N-23 WATER CHASING® Primer has zero VOC's and is a two-component primer.

Marble is a calcite mineral based material that is formed when both conditions of pressure and heat (called metamorphism) combine to form calcite crystals that then continue growing and become an interlocking crystalline network structure. Marble, with a Mohs hardness of only 3 is a soft mineral that, as the crystalline network is formed, also allows a variety of other minerals to align into the network causing mineral in-veining which is what many believe to be the beauty of marble. Unfortunately, each of those other minerals can cause fault lines which leads to a discontinuous substrate surface.

The ASTM D4541 test method is generally meant to measure the pull off resistance from a chemically consistent substrate surface. Marble, being both chemically inconsistent and a discontinuous crystalline structure possesses many different tensile strengths on any given surface. No two cut stones are identical. While this makes for a very aesthetically pleasing appearance it also causes several issues in yielding consistent test results and in interpreting the results of the ASTM D4541 testing.

Stable, chemically consistent substrates normally yield test results that are consistent as to the type of failure across the entire face of the test dolly. However, the results of pull testing off of marble results in various pull-off results on the face of a single dolly. Therefore, because of the above-stated variableness of the substrate and the dependent result, it is not possible to classify the type of failure for an entire dolly face. This is not true when the tensile strength of the marble is so weak that it fails at a low bond strength and releases small calcite crystals into the coating/adhesive with the substrate failure.

Testing Approach. The mineral weakness of marble as well as the difficulty of bonding to marble and bonding marble to other substrates is well known to those that are skilled in the art. The inventor has performed many ASTM 4541 pull tests on a variety of marble samples and vendor sources over the 20+ years of work.

It is typical for the adhesive strength of the coating/adhesive to exceed the cohesive strength of the marble substrate at the interface of the coating/adhesive and the marble surface thereby causing the substrate surface failure by pulling just a few crystals of the calcite marble off. The greater the calcite crystalline network depth that the adhesive force can be applied to the greater the tensile strength of the marble that is resisting the pull off. This is because with a greater depth, the force has to overcome and break the crystalline interconnecting network, whereby if the force is applied against just the surface crystals, removed from their network (and likely dislodged by the cutting of the stone), then the tensile strength is comparatively low.

The technical challenge to achieving sufficient bond strength of a coating/adhesive to marble has therefore always been two fold: 1) how to get the adhesive force to have to pull apart the inside of the crystalline interconnecting network and not just apply the force to the crystals as the surface whereby removing small sections of individual crystals requires little adhesive force and 2) how to get a greater pull off force not being applied directly against the marble but having the coating/adhesive "absorb" some of the pull off force.

Therefore, on this occasion it was determined that not only different measures of substrate preparation by mechanical abrasion be applied to the test areas of the marble, but also that a unique, WATER CHASING® penetrating primer (from Creative Material Technologies, Ltd.—www.dynasolv.com) be applied prior to the coating/adhesive application that could potentially penetrate into the marble substrate, chemically react into the interconnecting crystalline network inside the substrate and provide a chemical bond with the coating/adhesive itself.

The study demonstrate that the Water Chasing® penetrating primer achieved the desired effect of creating a 3 dimensional adhesion profile that included a greater amount of the marble crystalline network thereby increasing the force required to break away the pull test dolly from the surface of marble. The study results also demonstrated that the high tensile strength of the GO/polyurea absorbed some of the pull off force thus reducing the force being directly applied to the marble substrate. The test study run with only the GO/polyurea coating/adhesive achieved an average of 500 psi pull off force before breaking. That is 250% more than the 200 psi with the same polyurea adhesive/coating base formulation that had not been enhanced with the graphene oxide that has been seen consistently over years of testing. One of the test studies run with the WATER CHASING® penetrating primer applied prior to the GO/polyurea coating/adhesive achieved an average of 950 psi pull off force before breaking. This increased the pull test results another 90% for a combined increase of more than 400%

Therefore, the adhesive force would be applied to the depth of penetration on the primer into the crystalline interconnecting network and not just to the marble surface, but again into the body of the calcite crystalline network itself.

If successful, this would provide a new approach to bonding to marble (and other materials including but not limited to tile, stone, and granite) that would enable the entire tile and stone marketplace to advance into new performance criteria. This potential development has been of great interest to many in the field for decades.

Therefore, the objective of this study is not to test and record analytical data for the purpose of meeting any specific, industry-related, recognized specification or standard, since no such marble specific specification for this resin exists, partially due to the inconsistencies of marble as a substrate and partially due to the unique chemistry and its performance characteristics that are not yet generally known in the industry. Rather, the objective of this study is to determine whether the test results of this coating/adhesive with this marble are sufficiently high enough to permit any particular job to be done and to provide a new safer, higher performing adhesive approach for these industries than is presently available in the marketplace today.

There are some specifications or standards that, while may not be addressing marble specifically as the substrate, nor polyurea as the resin, nor vertical hanging as the specific applications may be helpful for understanding the orders of magnitude for this industry.

There are epoxy oriented specifications for tile like ANSI 118.3, but these are also designed for tile setting grouts not true adhesives. Additionally, tile and marble adhesives for vertical walls have ANSI 136.1, which refers to minimum required adhesive bond strengths of 50 psi for standard materials and 100 psi for "high strength" material. Also, it is important to note that articles have been written regarding the importance of deformability and recovery of the adhesive and tile setting materials to prevent tile/stone cracking.

Lastly, there was one draft document located: (http://www.puntofocal.gov.ar/notific_otros_miembros/ken134_t.pdf) that calls out marble specifically This document refers to minimum adhesive bonds strength requirements in Table 1 on Page 7 of (1 N/mm2) 145 psi for standard materials and (2 N/mm2) 290 psi for "high strength" materials.

Results discussion and summary. The following points are clear from the ASTM D4541 testing and observations made during the testing performed:

1) the density of these specimens were comparatively high and porosity comparatively low compared to marble test specimens previously tested.
2) Test Specimen 1 and Test Specimen 2 were different in their calcite crystal network density as seen by the testing results.
3) Application of coating/adhesive with a mechanical surface cleaning and no primer resulted in 100% calcite crystal failure only at the surface of the substrate with no depth of substrate cohesive failure. This is consistent with the vast majority of prior tests with other marble specimens.
4) There was a 19% increase in average adhesive bond strength when the coating/adhesive was applied the day after priming.
5) The lowest increase in average adhesive bond strength due to using this primer was 71% and the highest average adhesive bond strength due to using this primer was 239%.
6) The lowest average adhesive bond strength recorded was on the lower quality specimen with primer (Marble Test #1B) at 550 psi. This result would yield an effective adhesive bond strength of 79,200 pounds per square foot of physical contact of the coating/adhesive to the marble substrate. According to these test results this would be the "worst case" scenario.
7) Alternatively, the "best case" scenario would be Marble Test #4 at 1093 psi as the average adhesive bond strength. This result would yield an effective adhesive bond strength of 157,392 pounds per square foot of physical contact of the coating/adhesive to the marble substrate.

Figure 12:
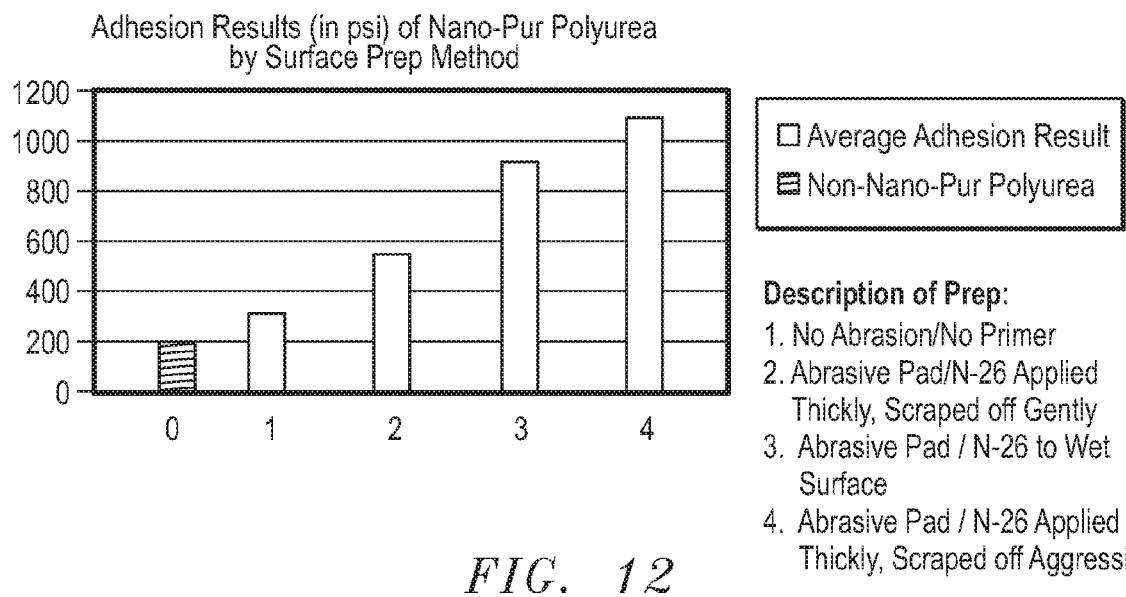
FIG. 12 is a graph that compares a polymer without the reactive additive of the present invention, to the polymer that includes the nanoparticles of the present invention, measured in adhesion strength in pounds per square inch (psi).

The test results are summarized in FIG. 12, which compares the polymer without the reactive additive, to the polymer that includes the nanoparticles of the present invention. It was found that the non-modified polyurea had an adhesive strength of 200 psi, which agrees with the known adhesive strength of polyureas known in the art on porous materials such as marble. The present invention is shown to dramatically increase the adhesion strength to marble, including without any abrasion or primer, with abrasion and WATER CHASING® primer (N-26), with abrasion and with WATER CHASING® primer on a wet surface, and with abrasion and thickly applied and aggressively removed WATER CHASING® primer. The increase in adhesive strength in psi was: over 200, 300, 550, 900 and 1050 psi. First, the polyurea graphene oxide composite was critical to achieving sufficient adhesive bond strength with marked increases in test results. Therefore, this primer must be used. Second, since this marble was noted to be of high density and low porosity, mechanical abrasion prep is highly recommended, so as to maximize the surface area into which the primer may penetrate. Due to low porosity of the marble, the water and primer should typically be applied in a horizontal position, so that gravity may assist in the penetration process. Third, it became readily apparent that the test results of this primer and coating/adhesive system demonstrated superior adhesive bond to any known specification and/or standard. Additionally, it is shown that the minimum tested adhesive bond is sufficient for this particular application, and indeed exceeds the requirements in orders of magnitude.

Figure 13:
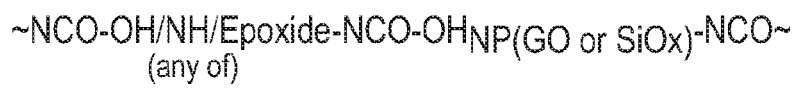
FIG. 13 shows the nanoparticle enhanced polymer chain of the present invention (in the case of GO, the GO can have an —OH and/or -epoxide group on its edge that covalently bonds to the polymer).

FIG. 13 shows the nanoparticle enhanced polymer chain of the present invention (in the case of GO, the GO can have an —OH and/or -epoxide group on its edge that covalently bonds to the polymer).

It was found that bond strengths are orders of magnitude higher than ever before due to the efficacy of the polyurea graphene oxide composite. The primer is penetrating into the marble and bonding into the body/depth of the marble crystalline structure instead of just the surface.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least 1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES

Enhanced thermal and mechanical properties of functionalized graphene/thiol-ene systems by photopolymerization technology; Chemical Engineering Journal; Bin Yu, et al.; May 15, 2013

Graphene-based polymer nanocomposites; Polymer; Jeffrey R. Potts et al.; Dec. 2, 2010

Electrical and mechanical properties of PMMA/reduced graphene oxide nanocomposites prepared via in situ; Journal of Materials Science; Sandeep Tripathi, et al.; September 2013

Review of functionalization, structure and properties of graphene/polymer composite fibers; Composites: Part A; Xuqiang Ji, et al.; Apr. 11, 2016

What is claimed is:

1. A method of creating a nanoparticle enhanced polymer composite comprising: (a) dispersing a nanoparticle, without damage to the nanoparticle, using a high speed shearing mixer in an isocyanate monomer/prepolymer to form a nanoparticle-isocyanate blend; and (b) reacting the nanoparticle-isocyanate blend with an amine, polyol, and/or phenolic polymer and/or prepolymer to form a polymer with a covalent bond between the nanoparticle and the polymer thereby forming the nanoparticle enhanced polymer composite,
wherein the nanoparticle is at least one of: a graphene oxide with an oxidation level greater than 0.1% and less than 55%, and polymerization is to an edge of the graphene oxide; or the nanoparticle is a graphene oxide that has a flake diameter to thickness ratio greater than 1 and less than 100,000.

2. The method of claim 1, wherein the nanoparticle-isocyanate blend is blended with an amine to produce the nanoparticle enhanced polymer composite.

3. A method of making a nanoparticle enhanced polymer composite comprising: selecting at least one of an amine, a polyol, or a phenolic polymer and/or prepolymer that does not set with a selected isocyanate in 30 seconds; dispersing a nanoparticle without damage to the nanoparticle using a sonicator or high speed shearing mixer in with the at least one of an amine, a polyol, or a phenolic polymer and/or prepolymer to form a non-reacted nanoparticle-amine, polyol and/or phenolic polymer and/or prepolymer blend suspension; and then forming the nanoparticle enhanced polymer composite,
wherein, the nanoparticle is at least one of: a graphene oxide with an oxidation level greater than 0.1% and less than 55%, and polymerization is to an edge of the graphene oxide; or a graphene oxide flake with a diameter to thickness ratio greater than 1 and less than 100,000.

4. The method of claim 3, wherein the method further comprises letting down or diluting an isocyanate concentrate with additional blend suspension to a predetermined loading to form a diluted isocyanate concentrate, then combining the diluted isocyanate concentrate with the non-reacted blend suspension to form the nanoparticle enhanced polymer composite.

5. The method of claim 3, wherein the nanoparticle enhanced polymer composite is formed by reacting the blend suspension with the selected isocyanate, wherein the nanoparticle forms a covalent bond with the isocyanate of the polymer composite.

6. The method of claim 3, wherein the method further comprises letting down or diluting a nanoparticle-amine, polyol and/or phenolic polymer and/or prepolymer concentrate with an isocyanate-blend to a predetermined loading to form a diluted concentrate, then combining the diluted concentrate with the blend suspension to form the nanoparticle enhanced polymer composite.

7. The method of claim 6, wherein the nanoparticle forms a covalent bond with the isocyanate of the polymer composite.

8. The method of claim 3, wherein a nanoparticle oxidation is comprised of one or more of the following: hydroxyl, carboxylic or epoxide.

9. The method of claim 3, wherein the nanoparticle has a reactive surface.

10. A method for increasing the strength of a porous material in at least one dimension, which comprises (a) dispersing a graphene oxide nanoparticle without damage to the nanoparticle using a sonicator or high speed mixer in an isocyanate monomer/prepolymer to form a nanoparticle-isocyanate blend; and (b) polymerizing the nanoparticle-isocyanate blend in the porous material to increase the porous material's strength in at least one dimension, wherein the increase in strength is at least 15, 17, 19, 20, 25, 30, 35, 40, 45, 50, 60, 75, 77, 80, 85, 90, 95, 100, 125, 150, 175,200, 300 or 390 percent.

11. The method of claim 10, wherein the porous material is natural or artificial, or selected from marble, tiles, bricks, masonry, concrete, granite, repair mortar, artificial granite, breeze block, capping stone, glass, fiberglass, hardened roof tiles, and ceramic materials.

12. The method of claim 10, wherein adhesion of the polymerized nanoparticle-isocyanate blend to the porous material is over 200, 250, 300, 500, 900, and 1,050 psi.

13. A method for increasing the strength of a porous material in at least one dimension, the method comprising: selecting at least one of an amine, a polyol, or a phenolic polymer and/or prepolymer that does not set with a selected isocyanate in 30 seconds; dispersing a graphene oxide nanoparticle without damage to the nanoparticle using a sonicator or high speed mixer in with the at least one of an amine, a polyol, or a phenolic polymer and/or prepolymer to form a non-reacted nanoparticle-amine, polyol and/or phenolic polymer and/or prepolymer blend suspension; polymerizing the nanoparticle-amine, polyol and/or phenolic polymer and/or prepolymer blend suspension in a porous material to increase the porous material's strength in at least one dimension, wherein the increase in strength is at least 15, 17, 19, 25, 30, 35, 50, 75, 77, 80, 85, 90, 95, 100, 125, 150, 175, 200, 300, 400, 500, 600, 700, 800, 900, 1,000, or 1,050 percent.

14. The method of claim 13, wherein the porous material is natural or artificial, or selected from marble, tiles, bricks, masonry, granite, repair mortar, artificial granite, breeze block, capping stone, concrete, hardened roof tiles, glass, fiberglass, and ceramic materials.

15. The method of claim 13, wherein adhesion of the polymerized blend suspension to the porous material is over 200, 250, 300, 500, 900, and 1,050 psi.

16. A method for increasing the strength of a porous material in at least one dimension, which consists of (a) dispersing a reactive nanoparticle without damage to the nanoparticle using a sonicator or high speed mixer in an isocyanate monomer/prepolymer to form a nanoparticle-isocyanate blend; and (b) polymerizing the nanoparticle-isocyanate blend in the porous material to increase the porous material's strength in at least one dimension, wherein the nanoparticle reacts with the isocyanate, and wherein the increase in strength is at least 15, 17, 19, 20, 25, 30, 35, 40, 45, 50, 60, 75, 77, 80, 85, 90, 95, 100, 125, 150, 175,200, 300 or 390 percent.

17. A method for increasing the strength of a porous material in at least one dimension, which consists of (a) dispersing a silicon dioxide nanoparticle without damage to the nanoparticle using a sonicator or high speed mixer in an isocyanate monomer/prepolymer to form a nanoparticle-isocyanate blend; and (b) polymerizing the nanoparticle-isocyanate blend in the porous material to increase the porous material's strength in at least one dimension, wherein the silicon dioxide nanoparticle reacts with the isocyanate, and wherein the increase in strength is at least 15, 17, 19, 20, 25, 30, 35, 40, 45, 50, 60, 75, 77, 80, 85, 90, 95, 100, 125, 150, 175,200, 300 or 390 percent.

18. A method for increasing the strength of a porous material in at least one dimension, which comprises (a) dispersing a nanoparticle without damage to the nanoparticle using a sonicator or high speed mixer in an isocyanate monomer/prepolymer to form a nanoparticle-isocyanate blend; and (b) polymerizing the nanoparticle-isocyanate blend in the porous material to increase the porous material's strength in at least one dimension, wherein the increase in strength is at least 15, 17, 19, 20, 25, 30, 35, 40, 45, 50, 60, 75, 77, 80, 85, 90, 95, 100, 125, 150, 175,200, 300 or 390 percent,
wherein the nanoparticle is at least one of: a graphene oxide with an oxidation level greater than 0.1% and less than 55%, and polymerization is to an edge of the graphene oxide; the nanoparticle is a graphene oxide and is dispersed at a mass ratio greater than 0.01% and less than 80% to form a nanoparticle-amine concentrate; or the nanoparticle is a graphene oxide flake with a diameter to thickness ratio greater than 1 and less than 100,000.

19. A method for increasing the strength of a porous material in at least one dimension, which comprises (a) dispersing a nanoparticle without damage to the nanoparticle using a sonicator or high speed mixer in an isocyanate monomer/prepolymer to form a nanoparticle-isocyanate blend; and (b) polymerizing the nanoparticle-isocyanate blend in the porous material to increase the porous material's strength in at least one dimension, wherein the increase in strength is at least 15, 17, 19, 20, 25, 30, 35, 40, 45, 50, 60, 75, 77, 80, 85, 90, 95, 100, 125, 150, 175,200, 300 or 390 percent,
wherein the nanoparticle is at least one of: graphene oxide with an oxidation level between 4% and 10%; or the nanoparticle is a graphene oxide and is dispersed at a mass ratio greater than 0.01% and less than 80% to form a non-reacted nanoparticle-amine, polyol and/or phenolic polymer and/or prepolymer blend suspension.

20. A method for increasing the strength of a porous material in at least one dimension, the method consists of: selecting at least one of an amine, a polyol, or a phenolic polymer and/or prepolymer that does not set with a selected isocyanate in 30 seconds; dispersing a reactive nanoparticle without damage to the nanoparticle using a sonicator or high speed mixer in with the at least one of an amine, a polyol, or a phenolic polymer and/or prepolymer to form a non-reacted nanoparticle-amine, polyol and/or phenolic polymer and/or prepolymer blend suspension; polymerizing the nanoparticle-amine, polyol and/or phenolic polymer and/or prepolymer blend suspension in a porous material to increase the porous material's strength in at least one dimension, wherein the nanoparticle reacts during polymerization of the blend suspension in the porous material, wherein the increase in strength is at least 15, 17, 19, 25, 30, 35, 50, 75, 77, 80, 85, 90, 95, 100, 125, 150, 175, 200, 300, 400, 500, 600, 700, 800, 900, 1,000, or 1,050 percent.

21. A method for increasing the strength of a porous material in at least one dimension, the method comprising: selecting at least one of an amine, a polyol, or a phenolic polymer and/or prepolymer that does not set with a selected isocyanate in 30 seconds; dispersing a nanoparticle without damage to the nanoparticle using a sonicator or high speed mixer in with the at least one of an amine, a polyol, or a phenolic polymer and/or prepolymer to form a non-reacted nanoparticle-amine, polyol and/or phenolic polymer and/or prepolymer blend suspension; polymerizing the nanoparticle-amine, polyol and/or phenolic polymer and/or prepolymer blend suspension in a porous material to increase the porous material's strength in at least one dimension, wherein the increase in strength is at least 15, 17, 19, 25, 30, 35, 50, 75, 77, 80, 85, 90, 95, 100, 125, 150, 175, 200, 300, 400, 500, 600, 700, 800, 900, 1,000, or 1,050 percent,
wherein the nanoparticle is at least one of: a graphene oxide with an oxidation level greater than 0.1% and less than 55%, and polymerization is to an edge of the graphene oxide; the nanoparticle is a graphene oxide and is dispersed at a mass ratio greater than 0.01% and less than 80% to form a nanoparticle-amine concentrate; or the nanoparticle is a graphene oxide flake with a diameter to thickness ratio greater than 1 and less than 100,000.

22. A method for increasing the strength of a porous material in at least one dimension, the method consists of: selecting at least one of an amine, a polyol, or a phenolic polymer and/or prepolymer that does not set with a selected isocyanate in 30 seconds; dispersing a nanoparticle without damage to the nanoparticle using a sonicator or high speed mixer in with the at least one of an amine, a polyol, or a phenolic polymer and/or prepolymer to form a non-reacted nanoparticle-amine, polyol and/or phenolic polymer and/or prepolymer blend suspension; polymerizing the nanoparticle-amine, polyol and/or phenolic polymer and/or prepolymer blend suspension in a porous material to increase the porous material's strength in at least one dimension, wherein the increase in strength is at least 15, 17, 19, 25, 30, 35, 50, 75, 77, 80, 85, 90, 95, 100, 125, 150, 175, 200, 300, 400, 500, 600, 700, 800, 900, 1,000, or 1,050 percent,
wherein the nanoparticle is at least one of: a silicon dioxide particle with an oxidation level greater than 0.1% and less than 100%; the nanoparticle is a graphene oxide and is dispersed at a mass ratio greater than 0.01% and less than 80% to form a non-reacted nanoparticle-amine, polyol and/or phenolic polymer and/or prepolymer blend suspension; the nanoparticle is silicon dioxide and is dispersed at a mass ratio greater than 0.01% and less than 80% to form a non-reacted nanoparticle-amine, polyol and/or phenolic polymer and/or prepolymer blend suspension.

\* \* \* \* \*